(12) United States Patent
Bonaud et al.

(10) Patent No.: US 11,204,795 B2
(45) Date of Patent: Dec. 21, 2021

(54) METHOD AND A SYSTEM FOR OPTIMISING VIRTUAL MACHINE CLUSTERS OF A CLOUD COMPUTING PLATFORM

(71) Applicant: AMADEUS S.A.S., Biot (FR)

(72) Inventors: Jacques Bonaud, Cagnes sur Mer (FR); Vincent Boulineau, Antibes (FR); Michel Demazeau, Nice (FR)

(73) Assignee: AMADEUS S.A.S., Biot (FR)

( * ) Notice: Subject to any disclaimer, the term of this patent is extended or adjusted under 35 U.S.C. 154(b) by 111 days.

(21) Appl. No.: 16/811,321

(22) Filed: Mar. 6, 2020

(65) Prior Publication Data

US 2020/0293356 A1    Sep. 17, 2020

(30) Foreign Application Priority Data

Mar. 14, 2019    (FR) ...................... 1902609

(51) Int. Cl.
*G06F 9/455* (2018.01)
*G06F 9/50* (2006.01)
*G06F 9/54* (2006.01)
*G06F 11/30* (2006.01)

(52) U.S. Cl.
CPC ........ *G06F 9/45558* (2013.01); *G06F 9/5027* (2013.01); *G06F 9/542* (2013.01); *G06F 11/301* (2013.01); *G06F 2009/45562* (2013.01); *G06F 2009/45575* (2013.01); *G06F 2009/45591* (2013.01); *G06F 2009/45595* (2013.01)

(58) Field of Classification Search
CPC .................................................. G06F 9/45558
See application file for complete search history.

(56) References Cited

U.S. PATENT DOCUMENTS

| | | |
|---|---|---|
| 9,804,890 B1 | 10/2017 | Pai et al. |
| 9,971,621 B1 | 5/2018 | Berg et al. |
| 2015/0154039 A1 | 6/2015 | Zada et al. |
| 2015/0278061 A1 | 10/2015 | Siciliano et al. |
| 2018/0373556 A1* | 12/2018 | Tian ............... G06F 9/4881 |
| 2020/0236159 A1* | 7/2020 | Shang ............. G06F 9/45558 |

FOREIGN PATENT DOCUMENTS

WO    WO-2012160124 A1    11/2012

* cited by examiner

*Primary Examiner* — Charlie Sun
(74) *Attorney, Agent, or Firm* — Perry + Currier

(57) ABSTRACT

A method and a system are provided for optimising Virtual Machine (VM) instances (121) of a Virtual Machine (VM) cluster (120) in a cloud computing platform (100) to avoid the use of VM instances (121) with degraded performance. The optimisation process of the VM instances (121) comprises the steps of identifying and optimising VM instances (121) with degraded performance in VM clusters (120). The performance of the deficient VM instances may be optimised by requesting for each deficient VM instance (121) a corresponding replacement VM instance (121) to be created by the IaaS (170), and accordingly maintain the best performing VM instance from each pair of deficient and replacement VM instances (121).

15 Claims, 7 Drawing Sheets

METHOD AND A SYSTEM FOR OPTIMISING VIRTUAL MACHINE CLUSTERS OF A CLOUD COMPUTING PLATFORM

CROSS-REFERENCE TO RELATED APPLICATION

This application claims priority from French patent application no. 1902609, filed Mar. 14, 2019, the contents of which is incorporated herein by reference.

FIELD

The present invention relates to a method and a system for optimising Virtual Machine (VM) instances of a Virtual Machine (VM) cluster in a cloud computing platform to avoid using VM instances with degraded performance.

BACKGROUND

Over the past few years, the distribution of services/applications through a cloud computing platform has become mainstream. The main advantage of cloud computing is that it abstracts most of the concerns relating to the physical hardware and/or software resources, thus enabling users to concentrate on their core business instead of focusing on the maintenance and deployment of data centres. The cloud computing model is based on providing a user with access to physical computing resources on a pay-as-you-go basis, whereby the user pays for the started computing resources to run the services/applications on the cloud computing platform. As the demand for the cloud operated services/applications changes, the underline physical resources can be dynamically scaled to meet the computing needs of the cloud services/applications at any given time.

Operating a data centre can be highly expensive, and thus to make the cloud computing model profitable, cloud computing providers, also referred to as Infrastructure as a Service (IaaS) providers, are using the concept of virtualisation to allow multiple users to share the same underline physical computing resources. Virtualisation enables the partition of the hardware and/or software resources into isolated Virtual Machine (VM) instances, which can be assigned to a user on demand to run applications and/or services on the cloud computing platform.

In general, the quality of service and cost for running a cloud service and/or application on the cloud computing platform is highly dependent on the physical computing resources consumed by the allocated VM instances. In existing solutions, the allocation of physical computing resources is generally based on monitoring the resource utilisation, e.g. CPU utilisation, of each VM instance, running the cloud service and/or application. The utilisation of the computing resources allocated to each VM instance would vary according to the demand of the service and/or application hosted therein. However, in certain instances, the utilisation of a VM instance does not relate to the demand of the service and/or application but rather to the quality and/or type of computing resources assigned by the Infrastructure as a Service (IaaS) provider to the VM instances. The IaaS providers when requested to provide a number of VM instances with specific technical characteristics, are supposed to provide VM instances that are identical in terms of resources and performance. However, this is not always the case, and VM instances with degraded performance may be used instead. As a result, the overall performance of the VM cluster may be degraded, which may impact the Quality of Service (QoS) provided by the service and/or application. In existing solutions, the problem with the degraded performance may be overcome by increasing the number of VM instances in the VM cluster, e.g. via scaling of the VM instances. However, the increase of the VM instances would also unnecessarily increase the associated cost for instantiating the required VM instances.

SUMMARY

According to a first aspect of the present invention, a method for optimising a Virtual Machine cluster running in a cloud computing platform is provided. The VM cluster comprising a plurality of Virtual Machine (VM) instances, each VM instance being provisioned on at least one host device of at least one infrastructure service provider and configured to run at least one component of at least one software application configured to provide a cloud service, which cloud service is accessible to the user via a communication interface configured to receive and direct user requests to the cloud service, the method comprising: selecting a software application running in the VM cluster by means of a selection module; monitoring for the selected software application by means of a monitoring module, the corresponding at least one software application component in each VM instance of the VM cluster; and managing the plurality of VM instances by means of a VM management module; wherein managing the plurality of VM instances comprises: determining cluster parameters of the VM cluster, the cluster parameters comprising data relating to the technical characteristics of each VM instance, and the software application components running on each VM instance in the VM cluster; identifying, among the VM instances running the components of the selected software application, deficient VM instances where at least one VM performance metric is below a corresponding target performance value range; and optimising the performance of the deficient VM instances; wherein the step of optimising the performance of the deficient VM instances comprises: requesting the infrastructure service provider, a replacement VM instance having the same technical characteristics with each deficient VM instance; copying the components of the software application running on each deficient VM instance to each corresponding replacement VM instance; comparing at least one VM performance metric of each replacement VM instance with that of the corresponding deficient VM instance; and requesting to the Infrastructure service provider to terminate, based on the performance comparison results, the worst performing VM instance for each comparison, thereby defining a set of remaining VM instances, the set of remaining VM instances comprising the best performing VM instance for each comparison.

It has been found that it may be possible to continuously assess the performance of the VM instances in the VM cluster and thus avoid or at least minimise the use of VM instances with a degraded performance which may affect the Quality of Service (QoS) of the cloud service and/or software application. Furthermore, the present invention ensures that scaling of the allocated computing resources is performed as a response to an increased demand for the desired cloud service and/or software application rather due to the use of VM instances with degraded performance. The performance of a VM instance may be degraded due to several reasons. For example, the degraded performance may be caused due to a hardware issue on the host machines, also referred to as host devices, running the VM instances, e.g. a network card issues, memory cards, disk controller, CPU malfunction, and the like. Moreover, the performance degradation of the VM instances may be caused due to several software applications, which may have the same performance requirements, sharing the resources of the same VM instance. To ensure that each VM instance is performing according to the desired performance requirements of the software application, at least one performance metric may be monitored, either continuously or periodically. Furthermore, the step of identifying, and when necessary replacing, deficient VM instances may contribute to the efficient use by the software applications running in the VM cluster of the physical resources allocated to the VM instances, which may result in improving the performance of each VM instance for the at least one performance metric.

According to embodiments, the at least one VM performance metric comprises at least one application metric associated with at least one application component of the selected software application The at least one performance metric may be a VM performance metric comprising at least one application metric associated with at least one application component of the selected software application. For example, the at least one VM performance metric may be associated with the performance of an allocated physical resource such as CPU usage, memory usage, disk space, network device performance, datastore usage, Application crash rate (ACR), and user request rate. The application performance metrics may be in the form of Key Performance Indicators (KPIs). The performance metrics to be monitored may be selected by a user and/or being derived from a Service Level Agreement (SLA) between the infrastructure service provider, the cloud platform service provider and/or the software application service provider.

According to embodiments, for each of the at least one VM performance metric, the corresponding target performance value range is determined by the average performance value obtained for each of the VM performance metrics on all VM instances.

It has been found that by deriving each target performance value range from the average performance value of each VM instance for the corresponding VM performance metric may provide a more realistic view of the actual performance of the VM instances in the VM cluster. In this way broader technical issues may be highlighted e.g. with the performance of the physical resources allocated by the Infrastructure as a Service (IaaS) provider. In this way, a different set of actions may be triggered which may be followed by the steps for optimising the VM cluster. The technical characteristics of the VM instances may relate to the allocated CPU, memory capacity, and networking resources. The target performance value range for each VM performance metric may be determined by taking the performance value of VM instances having the same technical characteristics and running the same applications.

According to embodiments, optimising the performance of the deficient VM instances may be continuously repeated until each of the VM performance metrics is within the target performance value in all remaining VM instances.

By continuously repeating the optimisation step it is ensured that the VM cluster is provided with the best performing VM instances from Infrastructure as a Service (IaaS) provider. The continuous optimisation may result in avoiding the use of VM instances with degraded performance and thus maintaining the QoS provided by the software applications running on the VM instances.

According to embodiments, the number of VM instances to be terminated is determined based on a VM disruption budget indicating the number of VM instances that can be removed without impacting the quality of service of the software applications running in the VM cluster.

In this way, it is ensured that the required Quality of Service (QoS) provided by the software applications can be maintained during the step of optimising the VM cluster. The QoS may be impacted when the number of VM instances terminated exceeds a predetermined threshold, which may be defined by the user or calculated based on the performance requirements of the software application. The performance requirements of the software application may fluctuate over time, e.g. depending on the rate of the incoming user requests.

According to embodiments, the VM cluster comprises VM instances with heterogeneous technical characteristics.

It has been found that by integrating into a VM cluster heterogeneous type VM instances having different technical characteristics, may offer the advantage of hosting in the VM cluster a variety of software applications having different performance requirements. Furthermore, the integration of heterogeneous VM instances may bring the additional benefit of allowing the software application components to be redistributed in the VM cluster according to their performance requirements, which may fluctuate over time according to the demand experienced for the software application.

According to embodiments, optimising the performance of the deficient VM instances comprises a step of redistributing application components from deficient VM instances, to high-performing VM instances, where each of the at least one performance metric is above the corresponding target performance value range.

It has been found that by redistributing the software applications components may optimise the use of the physical resources allocated to the VM instances and may improve the performance of each VM instance. By performing the redistribution step, it is possible to spread the workload experienced by the software application components, thus improving the performance of the VM instances in the VM cluster. The redistributing step may be performed before or after the replacement step. For example, the redistribution step may be performed after the identification of the deficient VM instances but before the step of optimising the deficient VM instances. In this way, if the performance issue of the deficient VMs is resolved through the redistribution step, then it may not be necessary to perform the steps for optimising the deficient VM instances. However, the redistribution step may be performed after or as part of the steps for optimising the deficient VM instances.

According to embodiments, the redistribution comprises: identifying the performance requirements of the application components running on deficient VM instances; identifying, based on the performance and the technical characteristics of each high-performing VM instance, a VM instance candidates capable of accommodating the performance requirements of each of the identified application components; and copying the application component to selected high-performing VM instance candidate.

It has been found that performing the above redistribution steps has the advantage of distributing software application component according to their performance requirements in the VM cluster. For example, performance "hungry" software application components may be moved to high-performance VM instances with enough performance capacity to accommodate their performance requirements. As a result, redistributing software application components may contribute to the better use of the computing resources allocated to VM instances of the VM cluster by the application components.

According to embodiments, the at least one VM performance metric is selected by a user.

According to embodiments, the at least one VM performance metrics is derivable from a Service Level Agreement between the infrastructure service provider and the service provider of the cloud computing platform.

According to embodiments, the at least one VM performance metrics is associated with the performance of an allocated physical resource comprising at least one of CPU usage, memory usage, disk space, network device performance, datastore usage, software application throughput, Application crash rate (ACR), and user request rate.

According to embodiments, managing the plurality of VM instances comprises requesting from the monitoring module to monitor a specific performance metric of each VM instance.

According to according to embodiments, the VM management module is running on at least one VM instance.

According to embodiments, determining cluster parameters of the VM cluster, comprises at least one of: receiving from an IaaS layer, which is communicatively coupled to the Infrastructure service provider, information related to the resources allocated to the VM instances, and permission to access and request replacement VM instances directly from the Infrastructure service provider, and/or receiving from a PaaS layer, which is communicatively coupled to the cloud computing platform, information relating to the software applications running in the platform and thee location of the software application components in each VM cluster, and/or receiving from the monitoring module the application performance metrics of each software application component running in each VM instance.

It has been found that by communicatively coupling the VM management module with at least the IaaS layer, the PaaS layer, and the monitoring module has the advantage that the performance of each VM instance may be determined based on metrics derived directly from the applications running on each VM instance instead of relying on IaaS metrics, which are generally accessible only to the Infrastructure service provider, and difficult to change. In this way, it is possible to assess the performance of the VM instances in the VM cluster, and when necessary optimise the performance of the VM instances thus avoiding using VM instances with degrading performance that can impact the QoS provided by the applications running on the VM cluster. Furthermore, the use of information from the PaaS layer enables the optimisation module to identify how to best distribute within the cluster the application and/or application components, e.g. by moving the application components to better suited VM instances, to improve the performance of the impacted VM instances.

According a second aspect, a system for optimising a Virtual Machine cluster running in a cloud computing platform may be provided. The VM cluster comprising a plurality of Virtual Machine (VM) instances, each VM instance being provisioned on at least one host device of at least one infrastructure service provider and configured to run at least one component of at least one software application configured to provide a cloud service, which cloud service is accessible to the user via a communication interface configured to receive and direct user requests to the cloud service, the system comprising: a selection module configured to select at least one application (120) in the VM cluster; a monitoring module configured to monitor for the selected software application the corresponding at least one software application components in each VM instance of the VM cluster; and a VM management module communicatively coupled to the monitoring module and being configured to: determine cluster parameters of the VM cluster, the cluster parameters comprising data relating to the technical characteristics of each VM instance, and the software application components running on each VM instance in the VM cluster, and identify, among the VM instances running the components of selected software application, deficient VM instances where at least one VM performance metric is below a corresponding target performance value range; wherein the VM management module comprises an optimisation module for optimising the performance of the deficient VM instances, the optimisation module is configured to: request from the infrastructure service provider a replacement VM instance having the same technical characteristics with each deficient VM instance, copy the components of the software application running on each deficient VM instance to each corresponding replacement VM instance, compare at least one VM performance metric of each replacement VM instance with that of the corresponding deficient VM instance and request to the Infrastructure service provider to terminate, based on the performance comparison results, the worst performing VM instance for each comparison, thereby defining a set of remaining VM, the set of remaining VM instances comprising the best performing VM instance for each comparison.

According to embodiments of the second aspect, the at least one VM performance metric comprises at least one application metric associated with at least one application component of the selected software application According to embodiment of the second aspect, for each of the at least one VM performance metric, the corresponding target performance value range is determined by the average performance value obtained for each of the VM performance metrics on all VM instances According to embodiments of the second aspect, the optimisation module is configured for continuously optimising the performance of the deficient VM instances until each of the VM performance metrics is within the target performance value in all remaining VM instances.

According to embodiments of the second aspect, the number of VM instances to be terminated is determined based on a VM disruption budget indicating the number of VM instances that can be removed without impacting the quality of service of the software applications running in the VM cluster.

According to embodiments of the second aspect, the VM cluster comprises VM instances with heterogeneous technical characteristics.

According to embodiments of the second aspect, the optimisation module is configured to redistribute application components from deficient VM instances, to high-performing VM instances, where each of the at least one performance metric is above the corresponding target performance value range.

According to embodiments of the second aspect, the optimisation module is configured to redistribute application components by performing: identifying the performance requirements of the application components running on deficient VM instances; identifying, based on the performance and the technical characteristics of each high-performing VM instance, a VM instance candidates capable of accommodating the performance requirements of each of the identified application components; and copying the application component to selected high-performing VM instance candidate.

According to embodiments of the second aspect, the at least one VM performance metric is selected by a user.

According to embodiments of the second aspect of the present invention, the at least one VM performance metrics is derivable from a Service Level Agreement between the infrastructure service provider and the service provider of the cloud computing platform.

According to embodiments of the second aspect of the present invention, the at least one VM performance metrics is associated with the performance of an allocated physical resource comprising at least one of CPU usage, memory usage, disk space, network device performance, datastore usage, software application throughput, Application crash rate (ACR), and user request rate.

According to embodiments of the second aspect, the VM management module is configured to request from the monitoring module to monitor a specific performance metric of each VM instance.

According to embodiments of the second aspect, the VM management module is running on at least one VM instance. It has been found that by integrating the optimisation module on at least one of the VM instances in the VM cluster may bring about the advantage of more accurately monitoring the performance of the VM instances in the VM cluster. Moreover, the monitoring module may run on at least one of the VM instances in the VM cluster.

According to embodiments of the of the second aspect, the VM management module is configured to determine the cluster parameters based on data received from at least one of: an IaaS layer, which is communicatively coupled to the Infrastructure service provider, information related to the resources allocated to the VM instances, and permission to access and request replacement VM instances directly from the Infrastructure service provider; a PaaS layer, which is communicatively coupled to the provider of the cloud computing platform, information relating to the software applications running in the platform and the location of the software application components their location in each VM cluster; and the monitoring module the application performance metrics of each software application component running in each VM instance.

BRIEF DESCRIPTIONS OF THE DRAWINGS

Embodiments are described with reference to the following figures.

DETAILED DESCRIPTION

The present invention will be illustrated using the exemplified embodiments shown in the FIGS. 1 to 7, which will be described in more detail below. It should be noted that any references made to dimensions are only indicative and do not restrict the invention in any way. While this invention has been shown and described with reference to certain illustrated embodiments thereof, it will be understood by those skilled in the art that various changes in form and details may be made therein without departing from the scope of the invention encompassed by the appended claims. Furthermore, while the invention has been described with references to a particular system and/or a method for optimising virtual machine clusters of a cloud computing platform, it should be understood by those skilled in the art that changes in form and details may be made to facilitate other types of method and/or systems in related fields without departing from the scope of the invention encompassed by the appended claims.

Figure 1:
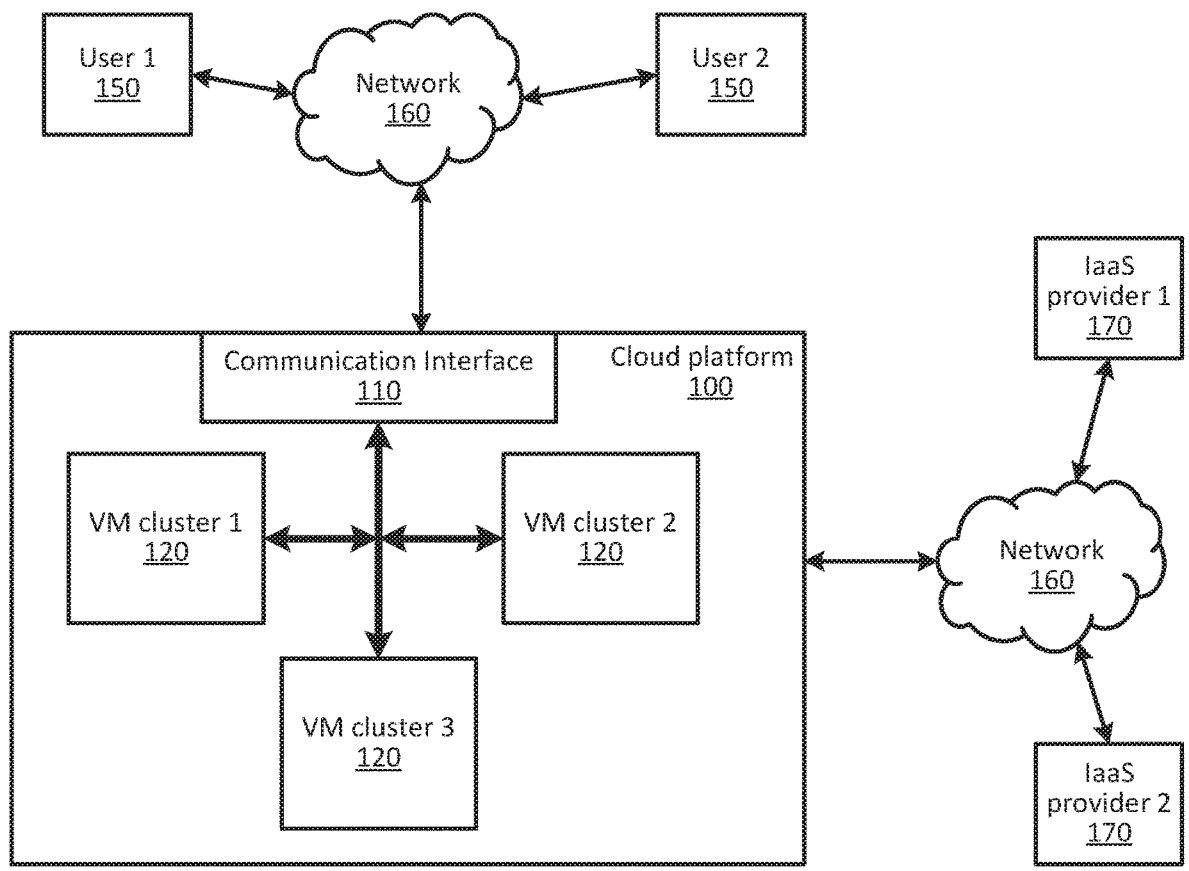
FIG. 1 shows an example of a cloud computing platform according to embodiments of the present invention.
Figure 2:
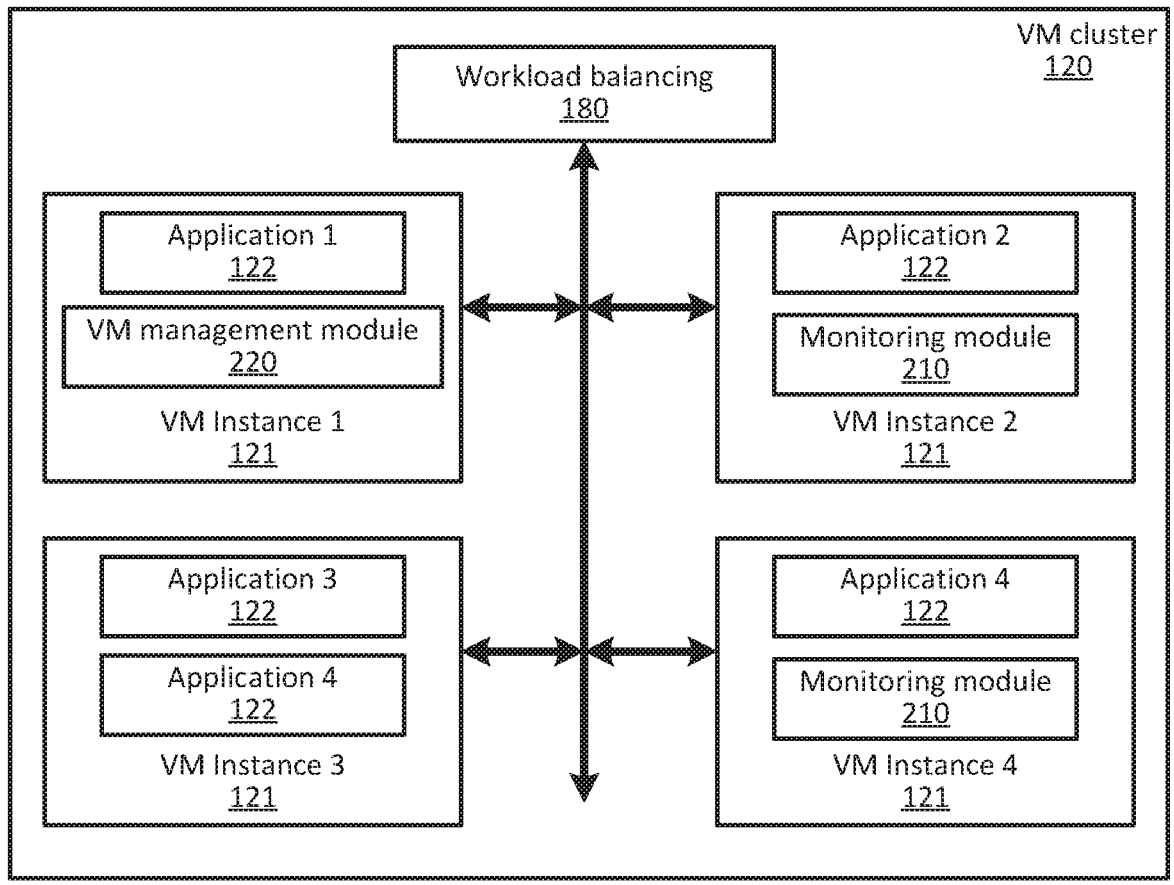
FIG. 2 shows an example of a VM cluster of a cloud computing platform according to embodiments of the present invention.

FIG. 1 shows an example of a cloud computing platform 100 according to embodiments of the present. The cloud computing platform 100 may be provided by a Platform as a Service (PaaS) provider and may comprise a communication interface 110 configured to receive requests from a plurality of users 150 through a communication network 160, e.g. the Internet, for accessing at least one application and/or service running on at least one Virtual Machine (VM) cluster 120. Each VM cluster 120 in the cloud computing platform 200 may be provided with a plurality of Virtual Machine (VM) instances 121, each arranged to run at least one software application 122 and/or at least one component of a software application 122, as shown in FIG. 2. For example, application blocks 122 (1, 2, 3, and 4) shown in FIG. 2, may refer to stand-alone software applications, and/or may refer to components of a software application, which may be distributed in the VM cluster 120. The VM instances 121 may be provisioned on a physical host device, e.g. a server computer of an Infrastructure as a Service (IaaS) provider 170 and allocated physical computing resources to support the operation of the software applications and/or application components 122 running on the VM instances 121. The allocated physical computing resources may include but not limited to the allocation of CPU, memory, Input/output devices, peripherals, operating software, networking devices, and the like. A monitoring module 210 may be provided to monitor at least one of the software applications 122 and/or software components 122 running on each VM instance 121, shown in FIG. 2 as application 1, 2, 3, and 4. The monitoring module 210 may be configured to run on at least one VM instance 121 of the VM cluster 120. For example, as shown in FIG. 2, VM instances 2 and 4 comprise a monitoring module 210, each configured to monitor at least one of the software applications and/or software application components 122 running on each VM instance 121 of the VM cluster 120. Preferably a selection module, not shown, may be provided for selecting at least one software application to be monitored. The selection module, may be a stand-alone or may be provided as part of the monitoring module 210. Each monitoring module 210 may be configured to monitor at least one VM performance metric associated with the components of the selected software application 122, or applications as the case may be, For example, the at least one VM performance metric may be associated with selected application metrics such as CPU usage, memory usage, disk space, network device performance, datastore usage, the application throughput, Application crash rate (ACR), the rate of user requests, and the like. The application metrics to be monitored may be selected by a user and/or derived, e.g. from a service level agreement (SLA). A VM management module 220 may be used to manage the VM instances 121 of the VM cluster 120. As shown in FIG. 2, the VM management module 210 may run on at least one of the VM instances 121. Each VM cluster 120 may be provided with a workload balancing module 180, which may be configured to distribute the user requests among the VM instances 121 running the requested software application 122 so as to distribute the workload experienced by each VM instance 121.

Figure 3:
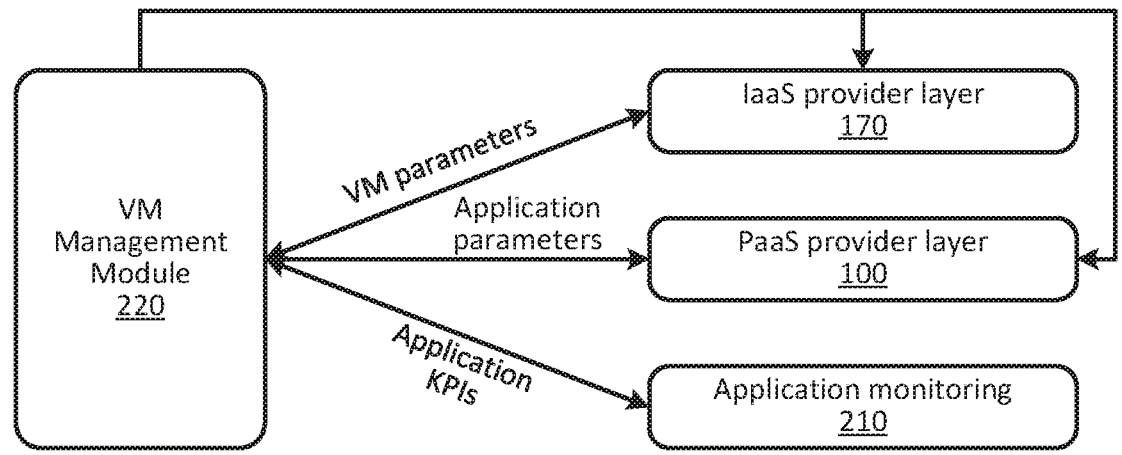
FIG. 3 shows an example of how the optimisation module is connected to the different layers of the cloud platform according to embodiments of the present invention.

As shown in FIG. 3, the VM management module 220 may be configured to access, via at least one Application Programming Interface (API), each layer of the cloud computing platform 100. For example, the optimisation module 220 may obtain from each layer a range of information, which may include:

from the IaaS provider layer 170 information relating to the technical characteristics of each VM instance 121 used in the selected VM cluster 120;

from the PaaS layer 100 information relating to the applications 122 running in each VM cluster and the location of the software application components in the VM instances 121 of the VM cluster 120, i.e. in which VM instance 121 each software application component is running; and from the application/monitoring module 210 information relating to the application performance metrics to be monitored, also referred to as Key Performance Indicators (KPIs).

The VM management module 220 may be configured via the API to request directly from the IaaS provider 170 the creation and/or termination of VM instances 121. In general, the VM management module 220 may use the information received from the PaaS layer 100 to automatically discover running applications and their location in the VM cluster 120 of interest, and may regularly poll all application/monitoring modules 210 running in the selected VM cluster 120 to obtain application performance indicators, also referred to as Key Performance Indicators (KPIs), which may be used to compute the performance levels of each VM instance 121 in the selected VM cluster.

Figure 4:
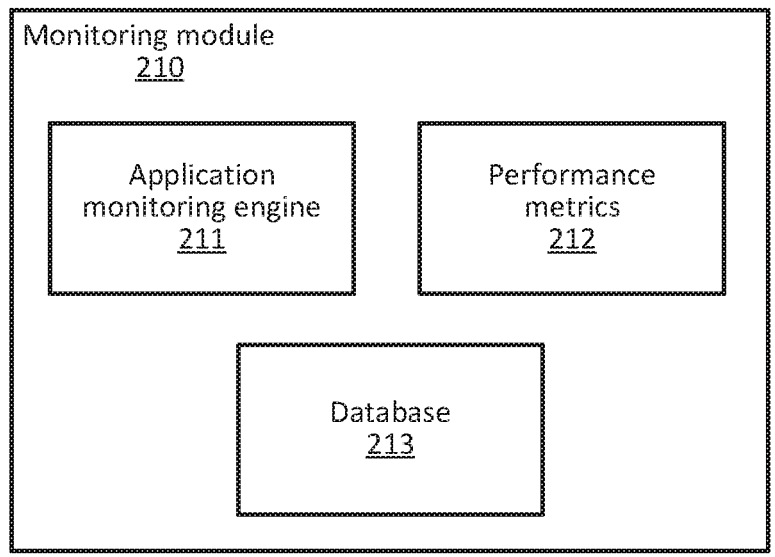
FIG. 4 shows an example of a monitoring module according to embodiments of the present invention.

FIG. 4 shows an example of a monitoring module 210 according to embodiments of the present invention. The monitoring module 210 may be provided with an application monitoring engine 211, which is configured for monitoring at least one application performance metric associated with at least one component of the selected software application. A performance metrics module 212 may be provided for selecting the performance metrics to be monitored. The application performance metrics to be monitored may be selected by a user and/or may be derived from the Service Level Agreement (SLA) between the infrastructure service provider and the cloud platform service provider. The VM management module 220 may request from the monitoring module 210 to monitor a specific application performance metric for each VM instance 121 in the VM cluster 120. The monitoring module 210 may further be provided with a database 213 for storing the values from the monitored performance metrics of the VM instances 121, and any other desired information.

Figure 5:
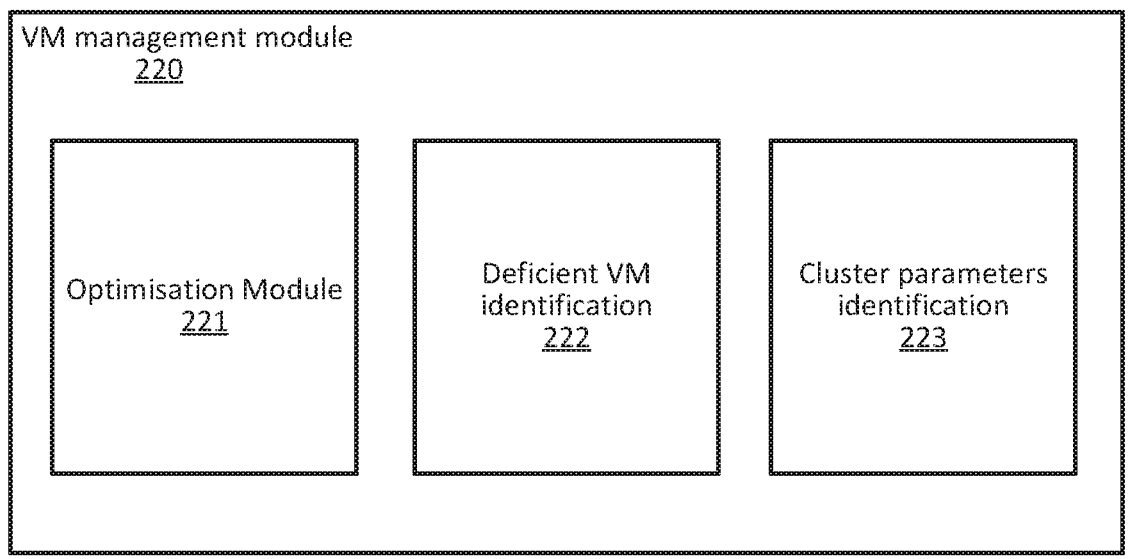
FIG. 5 shows an example of an optimisation module according to embodiments of the present invention.

FIG. 5 shows an example of a VM management module 220 according to embodiments of the present invention. The VM management module 220 may be configured to determine by means of a cluster parameter identification module 223 a set of cluster parameters of the VM cluster 120. The cluster parameters may be associated with the technical characteristics of each VM instance 121, and the components of the selected software application 122, or applications, running on each VM instance 121 in the VM cluster 120. Based on the cluster parameters and the performance metric values received from the monitoring module 210, the VM management module 220 may identify, by means of a deficient VM identification module 222, deficient VM instances 121 in the selected VM cluster 120 where at least one VM performance metric is below a corresponding target performance value range. The deficient VM identification module 222, may be configured for processing the values received from the monitoring module 210, and accordingly, determine whether the performance of each VM instance 121 is within a target value for the at least one performance metric. The deficient VM identification module 222 may further be configured for classifying each VM instance 121 operating below the target value for the selected performance metric as deficient. The information relating to the identified deficient VM instances 121 may be stored and communicated to an optimisation module 221. The optimisation module 221 may request, via an API, from the IaaS provider 170 to create a replacement VM instance for each deficient VM instance identified by the deficient VM identification module 222. Each replacement VM instance may have the same characteristics with each corresponding deficient VM instance. Once the replacement VM instances have been created, the optimisation module 221 may be configure to copy the software application running on each deficient VM instance to each corresponding replacement VM instance 121. The performance of each replacement VM instance for the at least one performance metric is determined, and accordingly the optimisation module 221 may decide which version of the VM instance, deficient VM instance or replacement VM instance, to keep in the VM cluster 120. The worst performing VM instance from each pair of VM instances, deficient VM instance and corresponding replacement VM instance, is requested to be terminated by the IaaS provider 170.

Figure 6:
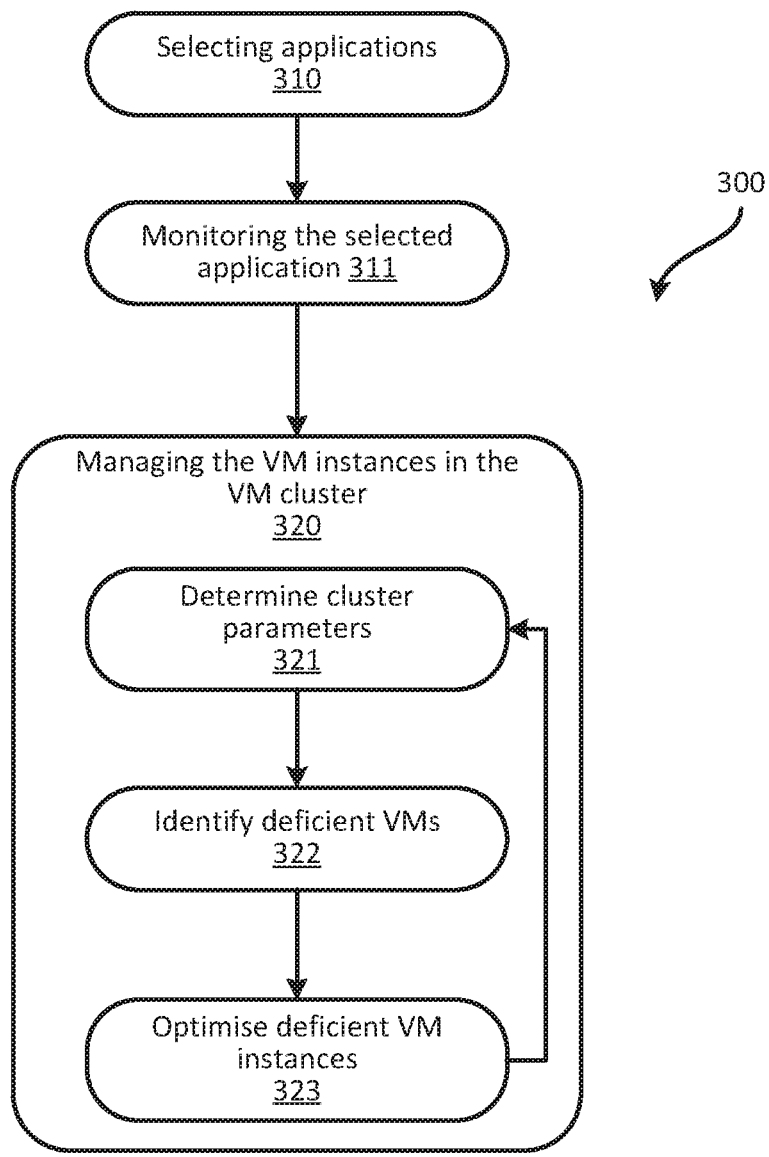
FIG. 6 shows an exemplified method for optimising a selected VM cluster in the cloud computing platform shown in FIGS. 1 to 5, according to embodiments of the present invention.

Further to the system for optimising a VM cluster 120, as previously described, an exemplified method 300 according to embodiments of the present invention may be provided. The method for optimising a VM cluster 120 may start at step 310 by selecting the software application and/or application components to be monitored. Step 310 may further include determining at least one application performance metric to be monitored. Step 310 may be followed by step 311 where the selected at least one software application is monitored for the selected at least one performance metrics. Step 320 is associated with managing the VM instances 121 in the VM cluster. The managing step 320 may be performed in a series of steps, as shown in FIG. 6. For example, the managing step 320 may include a step 321 whereby the VM cluster parameters are determined. The cluster parameters may comprise data relating to the technical characteristics of each VM instance, e.g. CPU, memory, networking device, and the software application components running on each VM instance in the VM cluster. Once the cluster parameters have been determined, step 322 may be performed to identify deficient VM instances in the selected VM cluster having at least one VM performance metric, which may have been defined in step 310, below a target performance value range. The target performance value range may be defined based on the desired maximum resource utilisation rate for each VM instance, which may be user or system defined. The resource utilisation rate may relate to the maximum and/or minimum utilisation of the physical resources allocated to each VM instance by the IaaS provider 170. Once at least one deficient VM instance has been identified, then step 323 may be triggered to optimise the deficient VM instances 121 in the VM cluster 120. The steps 321, 322, and 323 may be repeated continuously or periodically, thus ensuring that the VM cluster 120 is provided with the best performing VM instances 121 that may be generated from the at least one IaaS provider.

Figure 7:
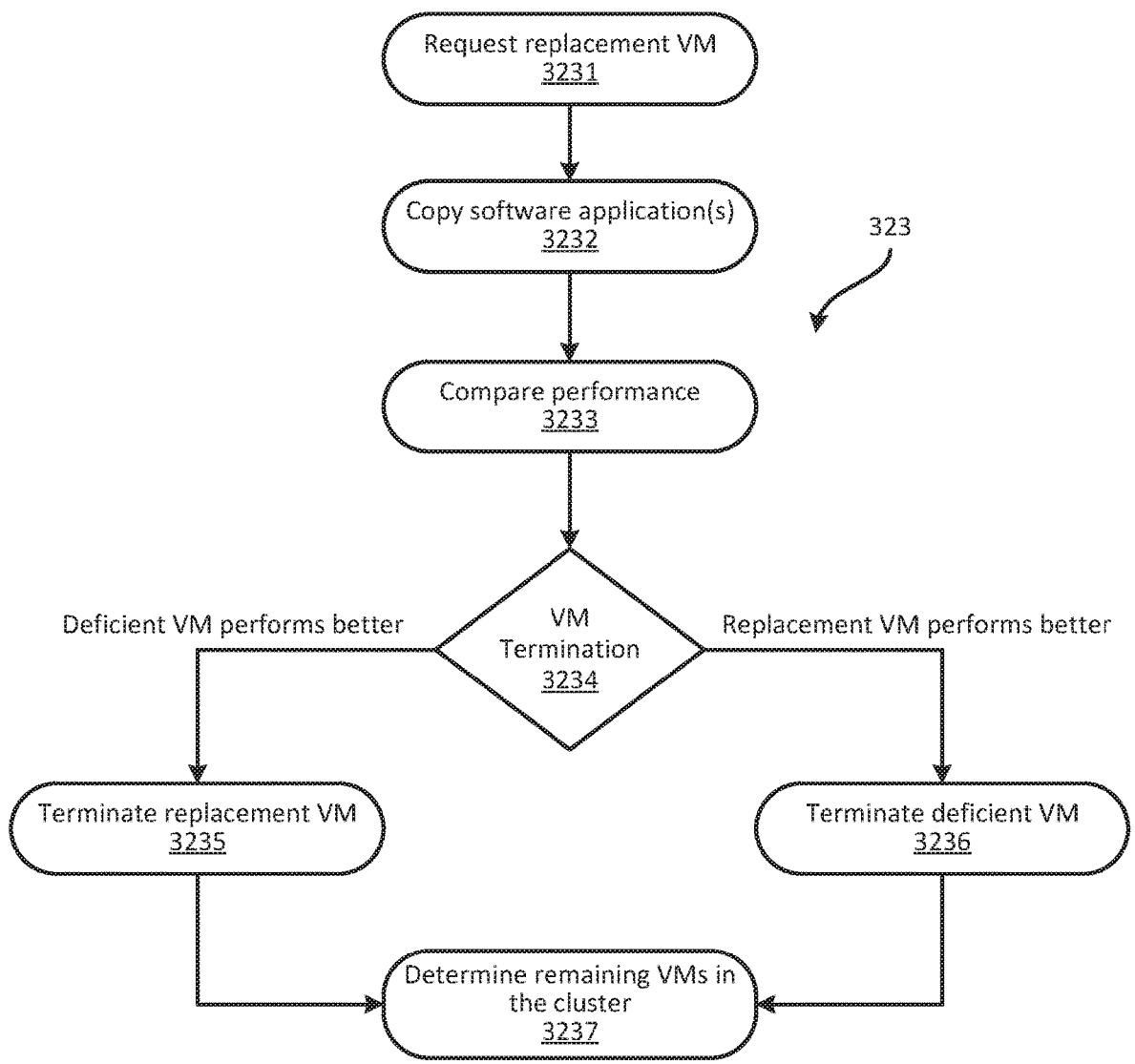
FIG. 7 shows an example of the method steps to be followed for optimising the deficient VM instances in the VM cluster according to embodiments of the present invention.

According to embodiments of the present invention, the step of optimising deficient VM instances 121 in the VM cluster 120 may comprise a series of steps, as shown in FIG. 7. For example, at step 3231 a request to the infrastructure service provider 170 may be issued for the generation of a replacement VM instance having the same technical characteristics with each identified deficient VM instance. Once the replacement VM instances have been generated, the software application components from each deficient VM instance are copied to the corresponding replacement VM instance, at step 3232. At step 3233, the performance of each replacement VM instance is compared with the performance of the corresponding deficient VM instance. The best performing VM instance 121 from each pair of deficient and replacement VM instances is identified for the same performance metric at step 3234. If the performance of the deficient VM is better than the performance of the corresponding replacement VM instance, then a termination request is issued at step 3235 to the IaaS provider 170 to terminate the replacement VM instance 121. On the other hand, if the performance of the replacement VM instance 121 is better than the performance of the corresponding deficient VM instance, then a termination request is issued at step 3236 to the IaaS provider 170 to terminate the deficient VM instance. Once the comparison for each pair of deficient and replacement VM instances has been completed, the step 3237 is triggered whereby a set of remaining VM instances is determined, the set of remaining VM instances comprises the best performing VM instance for each comparison.

An example of the invention may be given here, which should be considered for illustration purposes only. A cloud platform 100 from a platform as a service (PaaS) provider may be provided with a VM cluster 120, which comprises 20 VM instances 121, each running a component of a software application 122. At least one of the VM instances 121 is hosting a monitoring module 210, which is configured to monitor at least one application performance metric, e.g. CPU usage of the VM instance. A VM management module 220 is provided on one of the VM instances 121 of the VM cluster 120. The VM management module 220 is configured to manage the VM instances 121 for the selected application performance metric monitored by the monitoring module 210, which in this case may be the CPU usage of each VM instance. The monitoring module 210 monitors, according to the selected performance metric, the CPU usage of each VM instance 121 in the VM cluster. The VM management module 220 may continuously assess whether the performance of the each VM instance 121 for the selected performance metric, in this case the CPU usage, is within a target performance value range e.g. between 50-80% of the maximum VM instance performance. Once the VM management module 220, detects that the performance of some, e.g. five, VM instances 121 is above the target performance range e.g. is at 90%, then it will start an optimisation process by means of an optimisation module 221. The optimisation process, involves requesting from the infrastructure provider 170 to generate, according to this example, five replacement instances corresponding to the five VM instances 121 identified as deficient i.e. whereby the monitored performance metric is above the target performance value range. The five replacement VM instances 121 are generated with the same technical characteristics as the corresponding deficient VM instances. Once generated, the optimisation module 221 would copy the software application components 122 running on each of the five identified deficient VM instances 121 to each of the corresponding five replacement VM instances. The optimisation module 221, would then compare the performance for each replacement VM instance with each corresponding deficient VM instance pair for the same performance metric to identify which of the two versions for the same VM instance, deficient or replacement VM instance, performs better. For each pair, the worst performing VM instance is terminated, and a set of remaining VM instances is determined, which comprises the best performing VM instance 121 for each comparison. The VM management module 220, may repeat continuously the above steps to ensure that the VM cluster 120 comprises the best performing VM instances that can be generated from the selected IaaS provider 170.

In general, the routines executed to implement the embodiments of the invention, whether implemented as part of an operating system or a specific application, component, program, object, module or sequence of instructions, or even a subset thereof, may be referred to herein as "computer program code," or simply "program code," Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. The computer readable program instructions for carrying out operations of the embodiments of the invention may be, for example, assembly language or either source code or object code is written in any combination of one or more programming languages.

The program code embodied in any of the applications/modules described herein is capable of being individually or collectively distributed as a program product in a variety of different forms. In particular, the program code may be distributed using the computer readable storage medium having the computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other robust state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general-purpose computer, particular purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used, such terms are intended to be inclusive in a manner similar to the term "comprising".

While a description of various embodiments has illustrated all of the inventions and while these embodiments have been described in considerable detail, it is not the intention of the Applicants to restrict or in any way limit the scope to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the Applicants general inventive concept.

The invention claimed is:

1. A method for optimising a Virtual Machine cluster running in a cloud computing platform, the VM cluster comprising a plurality of Virtual Machine, VM, instances, each VM instance being provisioned on at least one host device of at least one infrastructure service provider and configured to run at least one component of at least one software application configured to provide a cloud service, which cloud service is accessible to the user via a communication interface configured to receive and direct user requests to the cloud service, the method comprising:

selecting a software application running in the VM cluster by means of a selection module;

monitoring for the selected software application by means of a monitoring module, the corresponding at least one software application component in each VM instance of the VM cluster; and managing the plurality of VM instances by means of a VM management module, wherein managing the plurality of VM instances comprises:

determining cluster parameters of the VM cluster, the cluster parameters comprising data relating to the technical characteristics of each VM instance, and the software application components running on each VM instance in the VM cluster;

identifying, among the VM instances running the components of the selected software application, deficient VM instances where at least one VM performance metric is below a corresponding target performance value range; and optimising the performance of the deficient VM instances, wherein optimising the performance of the deficient VM instances comprises:

requesting the infrastructure service provider a replacement VM instance having the same technical characteristics with each deficient VM instance;

copying the components of the software application running on each deficient VM instance to each corresponding replacement VM instance;

comparing at least one VM performance metric of each replacement VM instance with that of the corresponding deficient VM instance; and requesting to the Infrastructure service provider to terminate, based on the performance comparison results, the worst performing VM instance for each comparison, thereby defining a set of remaining VM instances, the set of remaining VM instances comprising the best performing VM instance for each comparison.

2. A method according to claim 1, wherein the at least one VM performance metric comprises at least one application metric associated with at least one application component of the selected software application.

3. A method according to claim 1, wherein for each of the at least one VM performance metric, the corresponding target performance value range is determined by the average performance value obtained for each of the VM performance metrics on all VM instances.

4. A method according to claim 1, wherein the steps performed for optimising the performance of the deficient VM instances are continuously repeated until each of the at least one VM performance metrics is within the corresponding target performance value range in all remaining VM instances.

5. A method according to claim 1, wherein the number of VM instances to be terminated is determined based on a VM disruption budget indicating the number of VM instances that can be removed without impacting the quality of service of the software application running in the VM cluster.

6. A method according to claim 1, wherein the VM cluster comprises VM instances with heterogeneous technical characteristics.

7. A method according to claim 6, wherein the step of optimising the performance of the deficient VM instances comprises a step of redistributing application components from deficient VM instances, to high-performing VM instances, where each of the at least one performance metric is above the corresponding target performance value range.

8. A method according to claim 7, wherein the redistribution comprises:
    identifying the performance requirements of the application components running on deficient VM instances;
    identifying, based on the performance and the technical characteristics of each high-performing VM instance, VM instance candidates capable of accommodating the performance requirements of each of the identified application components; and
    copying the application components to the corresponding high-performing VM instance candidates.

9. A method according to claim 1, wherein the at least one VM performance metric is selected by a user.

10. A method according to claim 1, wherein at least one VM performance metrics is derivable from a Service Level Agreement between the infrastructure service provider and the service provider of the cloud computing platform.

11. A method according to claim 1, wherein at least one VM performance metrics is associated with the performance of an allocated physical resource comprising at least one of Central Processing Unit usage, memory usage, disk space, network device performance, datastore usage, software application throughput, Application crash rate, and user request rate.

12. A method according to claim 1, wherein managing the plurality of VM instances comprises requesting from the monitoring module to monitor a specific performance metric of each VM instance.

13. A method according to claim 1, wherein the VM management module is running on at least one VM instance.

14. A method according to claim 1, wherein determining cluster parameters of the VM cluster, comprises at least one of:
    receiving from an Infrastructure as a Service layer, which is communicatively coupled to the Infrastructure service provider, information related to the resources allocated to the VM instances, and permission to access and request replacement VM instances directly from the Infrastructure service provider, and/or
    receiving from a Platform as a Service layer, which is communicatively coupled to the cloud computing platform, information relating to the software applications running in the platform and thee location of the software application components in each VM cluster, and/or
    receiving from the monitoring module the application performance metrics of each software application component running in each VM instance.

15. A system for optimising a Virtual Machine cluster running in a cloud computing platform, the VM cluster comprising a plurality of Virtual Machine, VM, instances, each VM instance being provisioned on at least one host device of at least one infrastructure service provider and configured to run at least one component of at least one software application configured to provide a cloud service, which cloud service is accessible to the user via a communication interface configured to receive and direct user requests to the cloud service, the system comprising:
    a selection module configured to select at least one application in the VM cluster;
    a monitoring module configured to monitor for the selected software application, the corresponding at least one software application components in each VM instance of the VM cluster; and
    a VM management module communicatively coupled to the monitoring module and being configured to:
        determine cluster parameters of the VM cluster, the cluster parameters comprising data relating to the technical characteristics of each VM instance, and the software application components running on each VM instance in the VM cluster, and
        identify, among the VM instances running the components of selected software application, deficient VM instances where at least one VM performance metric is below a corresponding target performance value range;
    wherein the VM management module comprises an optimisation module for optimising the performance of the deficient VM instances, the optimisation module is configured to:
        request from the infrastructure service provider a replacement VM instance having the same technical characteristics with each deficient VM instance;
        copy the components of the software application running on each deficient VM instance to each corresponding replacement VM instance;
        compare at least one VM performance metric of each replacement VM instance with that of the corresponding deficient VM instance; and
        request to the Infrastructure service provider to terminate, based on the performance comparison results, the worst performing VM instance for each comparison, thereby defining a set of remaining VM instances, the set of remaining VM instances comprising the best performing VM instance for each comparison.

* * * * *